(12) United States Patent
Yegerlehner (10) Patent No.: US 9,804,603 B1
(45) Date of Patent: Oct. 31, 2017

(54) CURVED PATH APPROXIMATION IN VEHICLE GUIDANCE SYSTEMS AND METHODS

(71) Applicant: AG LEADER TECHNOLOGY, Ames, IA (US)

(72) Inventor: James D. Yegerlehner, Ames, IA (US)

(73) Assignee: Ag Leader Technology, Ames, IA (US)

( * ) Notice: Subject to any disclaimer, the term of this patent is extended or adjusted under 35 U.S.C. 154(b) by 0 days.

(21) Appl. No.: 15/074,703

(22) Filed: Mar. 18, 2016

Related U.S. Application Data

(60) Provisional application No. 62/134,636, filed on Mar. 18, 2015.

(51) Int. Cl.
*G05D 1/02* (2006.01)
*G05D 1/00* (2006.01)

(52) U.S. Cl.
CPC ......... *G05D 1/0212* (2013.01); *G05D 1/0088* (2013.01)

(58) Field of Classification Search
CPC .................................................. G05D 1/0212
See application file for complete search history.

(56) References Cited

U.S. PATENT DOCUMENTS

| | | | |
|---|---|---|---|
| 8,131,415 B2 | 3/2012 | Peake | |
| 8,755,966 B2 * | 6/2014 | Halder | G05D 1/0274 701/25 |
| 9,020,757 B2 * | 4/2015 | Peake | B62D 15/025 180/204 |

OTHER PUBLICATIONS

Press, William H., et al. "Numerical Recipes in C", The Art of Scientific Computing, Second Edition, Chapter 15: Modeling Data, pp. 656-705, Copyright 1988-1992, Cambridge University Press.
Press, William H., et al. "Numerical Recipes in C", The Art of Scientific Computing, Second Edition, Chapter 18: Integral Equations and Inverse Theory, pp. 808-815, Copyright 1988-1992, Cambridge University Press.

* cited by examiner

*Primary Examiner* — Adam Tissot
*Assistant Examiner* — Michael Berns
(74) *Attorney, Agent, or Firm* — McKee, Voorhees & Sease, PLC (57) ABSTRACT

Improved vehicle guidance systems and methods are provided. A generated guidance curve approximates a vehicle trajectory path comprising a set of two-dimensional reference points. The guidance curve is based on a summed and weighted radial basis functions. Weighting is associated with coefficients calculated using linear least-squares regression to minimize approximation error between the guidance curve and the vehicle trajectory path. Guidance instructions are based, at least in part, on a nearest location point, and a tangent direction and curvature of the guidance curve at the nearest location point. The controller autonomously guides the vehicle along the guidance curve. The basis functions can have a cardinality less than a cardinality of the reference points. A distorting effect at the path ends can be minimized by augmenting the path ends of the vehicle trajectory path. Irregular reference point spacing can be mitigated using regularization techniques.

22 Claims, 6 Drawing Sheets

CURVED PATH APPROXIMATION IN VEHICLE GUIDANCE SYSTEMS AND METHODS

CROSS-REFERENCE TO RELATED APPLICATIONS

This application claims priority to U.S. Provisional Application Ser. No. 62/134,636 filed on Mar. 18, 2015, which is herein incorporated by reference in its entirety.

FIELD OF THE DISCLOSURE

The present disclosure relates generally to vehicle guidance systems and methods. More particularly, but not exclusively, the present disclosure relates to a vehicle guidance system and method that approximates a vehicle trajectory path in an improved manner and provides improved guidance instructions to a controller to guide the vehicle.

BACKGROUND OF THE DISCLOSURE

Autonomous vehicles are a rapidly growing area of research and development. While current publicity generally involves the autonomous passenger automobile, the applications for autonomous vehicles are wide ranging. One exemplary application of particular interest is agricultural implements.

Regardless of the application, the central feature of autonomous vehicles is the manner in which it senses its environment and navigates without human input. In a general sense, autonomous vehicle guidance involves guiding the vehicle along a planned vehicle trajectory path. The planned vehicle trajectory path often is represented as a curve. In a simplest form of a guidance system, the curve can be reduced to a piecewise linear curve that connects reference points or waypoints with linear segments, as illustrated generally in FIG. 1A. The piecewise linear curve suffers from several deficiencies. For example, at each reference point, the vehicle is required to instantaneously change its heading, which is not feasible while maintaining a desired speed. The abrupt change in the radius of curvature of the path results in the vehicle overshooting the subsequent linear segment and deviating from the path. Therefore, a need exists in the art for an improved system and method for representing the planned vehicle trajectory as a curve so as to avoid inducing unpleasant discontinuities and errors.

One such system and method includes defining the position, tangent direction and instantaneous curvature of the curve. U.S. Pat. No. 8,131,415 to Peake, which is herein incorporated by reference in its entirety, discloses providing a smooth curve representation of the planned trajectory by interpolating between adjacent waypoints with cubic splines. The interpolation method produces smooth curves to compute the instantaneous curvature of the guidance curve, which in turn is used to compute a steer angle and guide the vehicle.

While an improvement over piecewise linear curves, curve representation through interpolation can undesirably result in chaotic oversteering in response to the introduction of external errors. For example, as the vehicle rolls back and forth over uneven terrain during recording of reference points, side-to-side roll error in the reference point locations can create exaggerated instantaneous curvature in the trajectory path. Since, by its mathematical nature, interpolation requires the curve representation to pass precisely through each reference point, the control system, in response to the exaggerated instantaneous curvature, can command a steer angle that chaotically swings the steered wheels from side to side to attempt to correct the vehicle's path. The result is not only undesirable, but also can cause further guidance error. Therefore, a need exists in the art for an improved guidance system and method that attenuates problematic determinations of exaggerated instantaneous curvature and prevents induction of spurious steer angles.

BRIEF SUMMARY OF THE INVENTION

Therefore, a primary object, feature or advantage of the present disclosure is to improve upon the state of the art.

Another object, feature, or advantage of the present disclosure is to provide a smooth curve representation of a planned vehicle trajectory path in a manner that provides improved, accurate vehicle guidance by attenuating problematic determinations of exaggerated instantaneous curvature. In particular, the curve representation involves a linear least-squares fit of non-linear basis functions to the path reference points. The result prevents induction of spurious steer angles.

Still another object, feature, or advantage of the present disclosure is to provide a guidance curve using a summation of weighted radial basis functions. Each radial basis function is multiplied by a coefficient prior to summation. The cardinality of radial basis functions (and thus coefficients) is chosen to be fewer than the number of reference points, resulting in an overconstrained system with fewer degrees of freedom and no exact solution. The resulting guidance curve is neither a spline nor an interpolation, but rather is an approximation. The approximation does not pass precisely through each reference point, but rather follows an intermediate route between side-to-side deviations, attenuating the problematic effect of spurious curvature inducing spurious steer angles.

Still yet another object, feature, or advantage of the present disclosure is employing the technique of regularization to provide equally-spaced reference points despite deviations in vehicle speed. Providing equally-spaced reference points, and thus basis functions, prevents overfitting of the guidance curve to densely or sparsely populated reference points. In such an embodiment, the cardinality of the basis functions is no longer constrained to be less than the number of reference points, since regularization permits finding solutions to under-constrained systems.

A further object, feature, or advantage of the present disclosure is to remedy potential distortion at endpoints of the trajectory path. The distortion can be associated with linear least-squares regression. The distorting effect is translated beyond the endpoints of the trajectory path through extrapolation of a portion of the trajectory path proximate the endpoints.

These and/or other objects, features or advantages of the present disclosure will become apparent from the specification and claims.

According to one aspect of the present disclosure, a method of autonomous vehicle guidance is provided. A vehicle having a controller configured to guide the vehicle is provided. A set of two-dimensional reference points comprises a vehicle trajectory path. A guidance curve of the vehicle trajectory path is generated by summing a weighted plurality of basis functions for each of a coordinate pair. The basis functions have a cardinality less than a cardinality of the two-dimensional reference points. Further, the basis functions use, in part, linear least-squares regression configured to minimize approximation error between the guidance curve and the vehicle trajectory path.

The method further includes the step of generating guidance instructions. To do so, a nearest location point along the guidance curve relative to the vehicle is determined. A tangent direction of the guidance curve at the nearest location point is also determined. Thereafter, the curvature of a guidance curve is determined based, at least in part, on the tangent direction at the nearest location point. Based on the guidance instructions, the controller of the vehicle autonomously guides along the guidance curve the vehicle trajectory path. The guidance instructions are configured to provide the intermediate route between deviations along the vehicle trajectory path with the minimal approximation error. In a preferred embodiment, the basis functions are radial basis functions.

In at least some aspects of the present disclosure, each of the weighted basis functions can comprise a product of a coefficient and one of the basis functions. In an exemplary embodiment, the coefficient can be determined through the linear least-squares regression. One exemplary implementation method of linear least-squares regression includes singular value decomposition.

In at least some aspects of the present disclosure, the basis functions can be evenly spaced along the vehicle trajectory path. In a preferred embodiment, the step of determining the nearest location point further comprises iteratively evaluating the evenly-spaced basis functions until a terminating condition is achieved.

To preserve the tangent direction at the path ends, distortion associated with linear least-squares regression must be considered. In at least some aspects of the present disclosure, a distorting effect is minimized by translating beyond the endpoints of the trajectory path through extrapolation of a portion of the trajectory path proximate the endpoints. In other words, the method can further include the step of augmenting path ends of the vehicle trajectory path with two-dimensional waypoints in addition to the set of two-dimensional reference points. Minimizing distortion preserves the tangent direction of the guidance curve at the path ends.

By their nature, the radial basis functions are locally influential. Thus, in a preferred embodiment of the disclosure, a sliding window subset of two-dimensional reference points can be utilized to generate the guidance path. The subset includes the nearest location point of the vehicle, and reference points at least immediately proximate. An updated guidance curve is generated after each iterative updating of the sliding window subset.

According to another aspect of the present disclosure, a system for autonomous vehicle guidance comprises a vehicle having a controller configured to guide the same. The controller generates a guidance curve approximating a vehicle trajectory path comprising a set of two-dimensional reference points. The guidance curve is based, at least in part, on a summed plurality of radial basis functions each multiplied by a coefficient prior to summation. Guidance instructions are generated by the controller and based, at least in part, on a nearest location point along the guidance curve to the vehicle, a tangent direction of the guidance curve at the nearest location point, and a curvature of a guidance curve based on the tangent direction at the nearest location point. The controller can adjust the vehicle to the feed-forward steer angle to autonomously guide the vehicle along the guidance curve. In a preferred embodiment, the coefficients are determined using linear least-squares regression configured to minimize approximation error between the guidance curve and the vehicle trajectory path. The controller can execute a closed heading control feedback loop, and the vehicle is an agricultural implement.

In at least some aspects of the present disclosure, each of the radial basis functions can be associated with one coordinate of a coordinate pair each associated with easterly and northerly directions. Based on the nature of approximation, the vehicle does not necessarily pass precisely through every one of the two-dimensional reference points.

In at least some aspects of the present disclosure, irregular spacing of the reference points due to variations in vehicle speed during the autonomous guidance can occur. As a result, at least some aspects of the present disclosure include regularization of the set of reference points. In exemplary embodiments, the regularization is achieved by ridge regression based, at least in part, on a ratio of matrix traces.

DETAILED DESCRIPTION OF THE DISCLOSURE

Figure 1A:
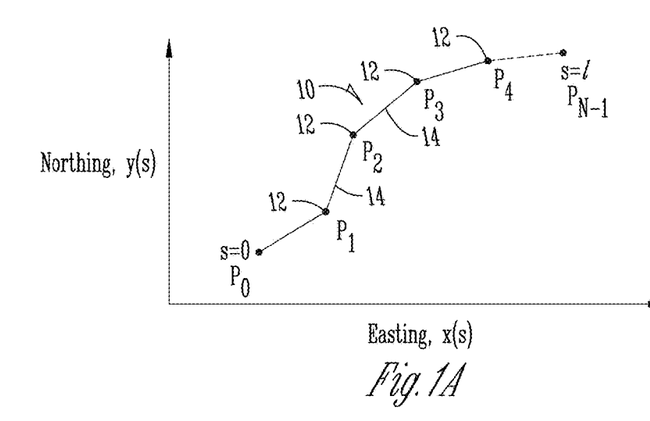
FIG. 1A illustrates a graphical representation of a vehicle trajectory path and guidance curve in accordance with an exemplary embodiment of the present disclosure.
Figure 1B:
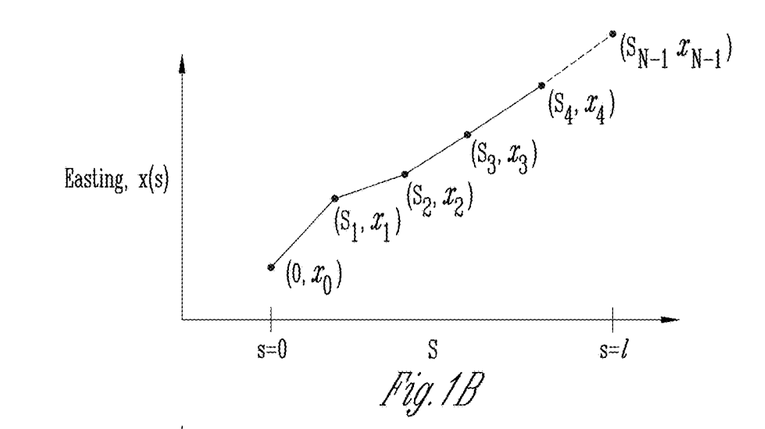
FIG. 1B illustrates a graphical representation of the easting component of the coordinate pair of the guidance curve of FIG. 1A in accordance with an exemplary embodiment of the present disclosure.
Figure 1C:
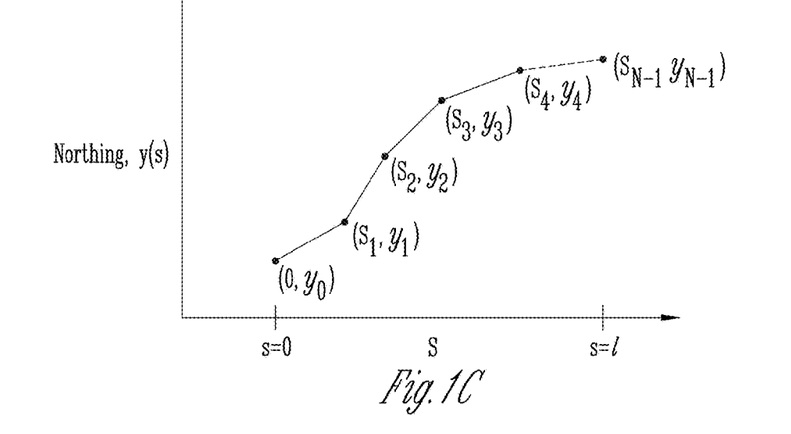
FIG. 1C illustrates a graphical representation of the northing component of the coordinate pair of the guidance curve of FIG. 1A in accordance with an exemplary embodiment of the present disclosure.

Automatic vehicle guidance involves guiding the vehicle along a planned vehicle trajectory path. In order to facilitate good control, the vehicle trajectory path can be represented as a guidance curve of the vehicle trajectory path and having a position, a tangent direction and an instantaneous curvature. Referring to FIG. 1A, a vehicle trajectory path 10 comprises a series of reference points 12 represented as $\{p_0, p_1, p_2, \ldots, p_{N-1}\}$ and separated by segments 14. The reference points 12 can be recorded by periodically logging locations as a vehicle operator drives a desired path, or otherwise input by a user to create a planned vehicle trajectory path. FIG. 1B illustrates an easting component of the points plotted against the distance along the path 10, s, which spans from zero to a length (s=l). FIG. 1C illustrates a graphical representation of the same path 10 for the northing component of the reference points. From FIGS. 1A-1C, it can be readily appreciated that the reference points are two-dimensional, as the present disclosure is primarily directed to vehicle guidance on the ground.

At least one of the primary objects of the present disclosure is to produce a smooth two-dimensional curve, $\bar{g}(s)$, such that each point given by $\{p_0, p_1, p_2, \ldots, p_{N-1}\}$ on the curve is specified by a coordinate pair $(x(s), y(s))$ where $x(s)$ is the easting component, $y(s)$ is the northing component, and s is some measure of distance along the path 10. Eq. 1 establishes this fundamental relationship:

$$\bar{g}(s) = \begin{bmatrix} x(s) \\ y(s) \end{bmatrix} \quad (\text{Eq. 1})$$

The functions $x(s)$ and $y(s)$ can be defined as follows:

$$x(s) = \sum_{m=0}^{M-1} w_{x,m} f_m(s) \quad (\text{Eq. 2})$$

$$y(s) = \sum_{m=0}^{M-1} w_{y,m} f_m(s) \quad (\text{Eq. 3})$$

$f_m(s)$ is the basis function evaluated at s; and M, $w_{xm}$, and $w_{ym}$ are coefficients to be suitably chosen as disclosed herein.

As represented by Eqs. 2 and 3, each component of the coordinate pair is produced by summing a number (M) of locally-influential basis functions $f_m(s)$ each multiplied by a coefficient ($w_{xm}$ or $w_{ym}$). The coefficient is associated with its respective component of the coordinate pair prior to summation. Thus, each of the weighted plurality of basis functions comprises a product of the coefficient and one of the weighted plurality of basis functions. In other words, the basis functions are weighted based on the multiplying of each basis function by the coefficient prior to summation.

Figure 2:
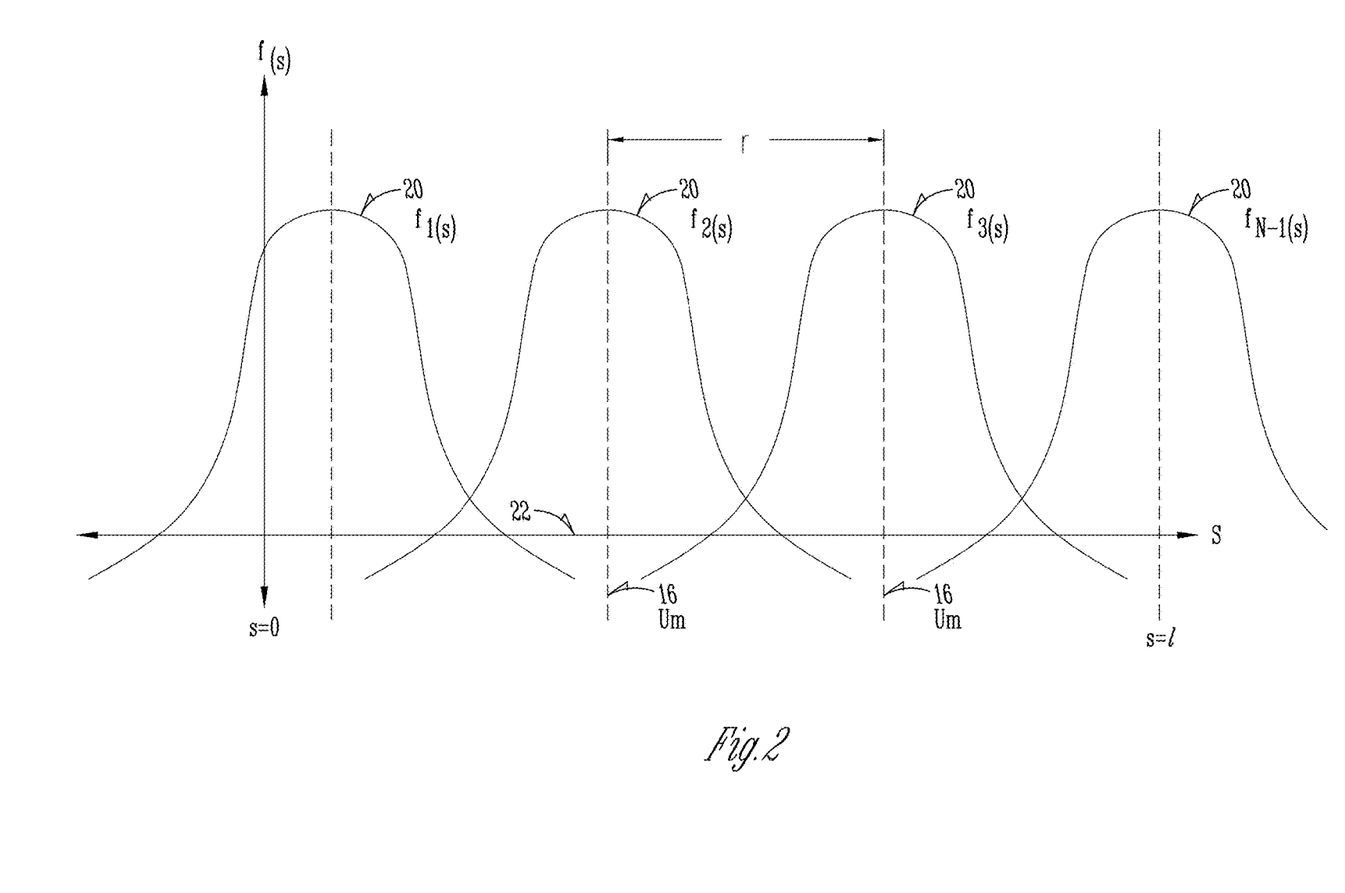
FIG. 2 illustrates a graphical representation of radial basis functions centered at locations evenly spaced along a length of the vehicle trajectory path in accordance with an exemplary embodiment of the present disclosure.

Referring to FIG. 2, a preferred basis function is a radial basis function (RBF) 20 of the following form:

$$f_m(s) = e^{-\gamma(z-u_m)^2} \quad (\text{Eq. 4})$$

In Eq. 4 and with reference to FIG. 2, $u_m$ is the center 16 of the basis function (i.e., the value at which s is a maximum). The parameter $\gamma$ determines the "width" of the basis function; i.e., the present disclosure notes that each $u_m$ will be different for each RBF 20 such that the M basis functions are evenly spaced over the length of the trajectory path.

The parameter $\gamma$ can be defined as follows:

$$\gamma = \frac{\alpha}{r^2} \quad (\text{Eq. 5})$$

In Eq. 5 with reference to FIG. 2, r is the distance 18 between the centers 16 of two adjacent RBFs 20. The distance 18 is determined, in part, by choosing to evenly space the RBFs 20 over the length of the vehicle trajectory path 10. The unitless parameter, $\alpha$, determines how fast the RBF 20 trends towards zero as s gets farther from the center, $u_m$. Based on empirical data, $\alpha=0.1$ in a preferred embodiment, but any suitable value can be used without deviating from the objects of the present disclosure.

In embodiments where the basis functions are spread evenly over the length of the path 10, and the coefficients $w_m$ of the basis functions are chosen correctly, the RBFs 20 can be evaluated at any value of s to closely and smoothly approximate locations of the N reference points. If M=N, a solution for the coefficients allows the curve to pass exactly through the N points, and therefore the curve is merely an interpolation of the reference points and subject to the problematic operation of methods commonly known in the art. In a preferred embodiment of the present disclosure, however, M is selected to be an integer less than N. In other words, the cardinality of the weighted basis functions to be summed is less than a cardinality of the reference points. Consequently, the system is over-constrained since M<N, and the guidance curve merely approximates the reference points rather than passes exactly through them. The closer M is relative to N, the closer the approximation. Based on empirical data, M is chosen to be 0.7N in a preferred embodiment, but any suitable value can be used without deviating from the objects of the present disclosure. The preferred value provides sufficiently close approximation to the reference points being preferably spaced at one to three meters apart. Furthermore, the present disclosure contemplates that the functions $f(s)=1$, $f(s)=s$ can be added to the RBFs 20, so long as the doing so does not increase M greater than or equal to N.

With the cardinality of M determined, the remaining unknown parameters of Eqs. 2 and 3 are the coefficients $w_{xm}$ and $w_{ym}$. To determine or approximate the coefficients, linear least-squares regression is utilized such that to evaluate the functions $x(s)$ and $y(s)$ at each of the reference points and minimize approximation error. The coefficients can be determined by solving the following equation for the matrix, W, of coefficients.

$$\phi w = x \quad (\text{Eq. 6})$$

The N-by-M matrix $\phi$ can be defined as follows:

$$\phi = \begin{bmatrix} f_0(s_0) & f_1(s_0) & \ldots & f_{M-1}(s_0) \\ f_0(s_1) & f_1(s_1) & \ldots & f_{M-1}(s_1) \\ \vdots & \vdots & \ddots & \vdots \\ f_0(s_{N-1}) & f_1(s_{N-1}) & \ldots & f_{M-1}(s_{N-1}) \end{bmatrix} \quad (\text{Eq. 7})$$

In Eq. 7, $f_m$ is the RBF 20, of which there are M, and $s_n$ is the distance along the piecewise-linear path of reference point n, of which there are N. Matrix W is the M-by-2 matrix of the coefficients and can be defined as follows:

$$W = \begin{bmatrix} w_{x,0} & w_{y,0} \\ w_{x,1} & w_{y,1} \\ \vdots & \vdots \\ w_{x,M-1} & w_{y,M-1} \end{bmatrix} \quad (\text{Eq. 8})$$

Matrix X is an N-by-2 matrix containing the reference points fitted to the guidance curve and can be defined as follows:

$$X = \begin{bmatrix} x_0 & y_0 \\ x_1 & y_1 \\ x_2 & y_2 \\ \vdots & \vdots \\ x_{N-1} & y_{N-1} \end{bmatrix} \quad \text{(Eq. 9)}$$

As mentioned, the linear least-squares regression minimizes the approximation error between the guidance curve and the vehicle trajectory path. Thus, in a preferred embodiment, W is determined such that the distance of the guidance curve $\bar{g}(s)$ from the reference points is also minimized. To do so, a least-squares error minimizing solution for W can use a singular value decomposition (SVD) as disclosed in "NUMERICAL RECIPES IN C: The Art of Scientific Computing", Press et. al, published 1988-1992 by Cambridge University Press, which is herein incorporated by reference in its entirety. The present disclosure contemplates other means to provide SVD implementation such as the JacobiSVD algorithm provided by the open-source Eigen linear algebra C++, which is also herein incorporated by reference in its entirety. The SVD implementation can exhaust computing resources and/or require relatively longer computing time (e.g., approximately 200 milliseconds for a set of 80 reference points) relative to the real-time periodic processing that the controller requires, the present disclosure contemplates SVD implementation can be run on a lower-priority thread on a multi-core processor such that higher priority real-time periodic processing is not blocked.

Figure 3:
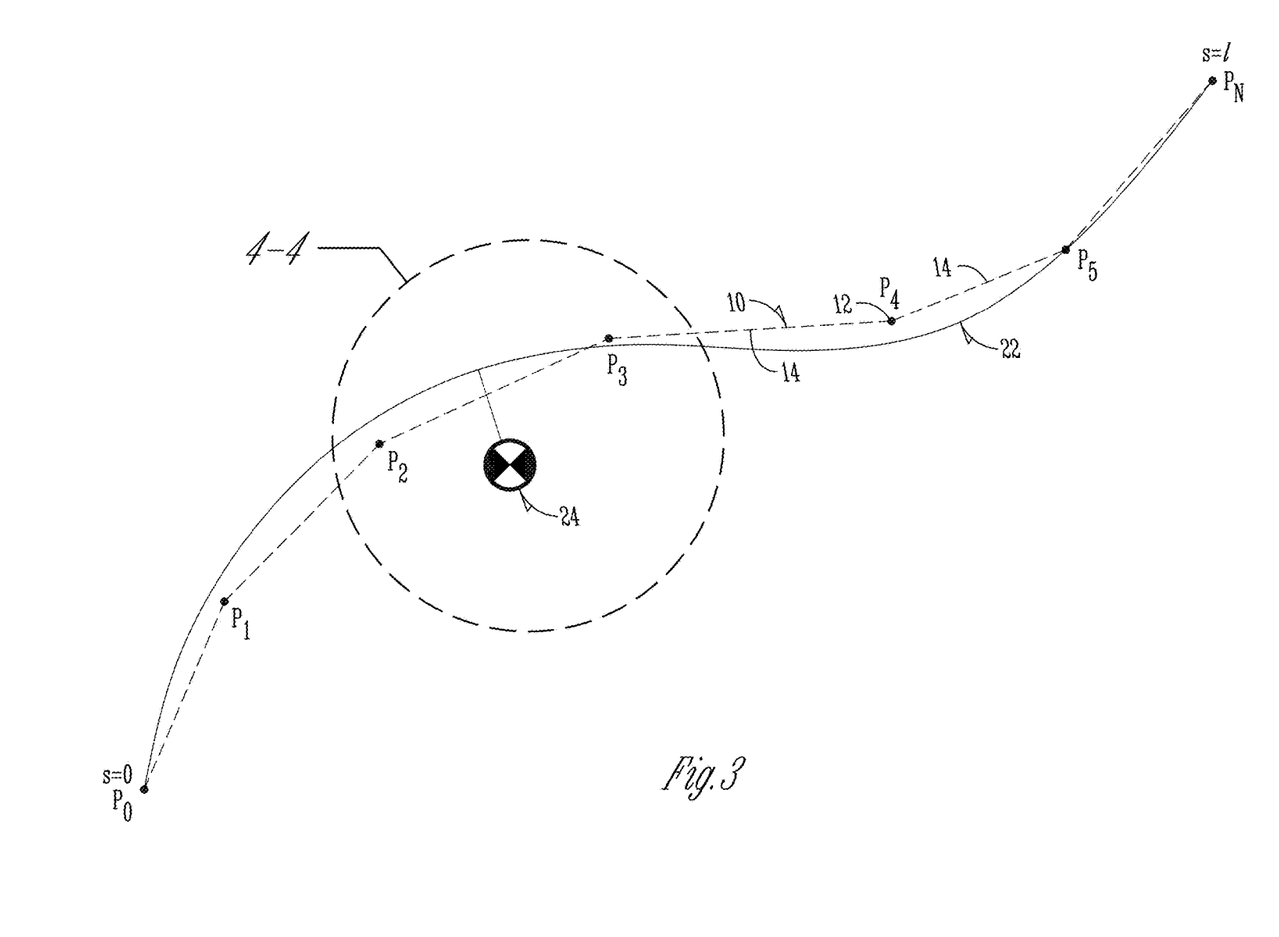
FIG. 3 illustrates a vehicle trajectory path and guidance curve in accordance with an exemplary embodiment of the present disclosure. The figure includes a schematic representation of a vehicle.

With values for the coefficients, centers, and width of the basis functions, the guidance curve 22, $\bar{g}(s)$ has been fully determined. One exemplary graphical representation of a guidance curve 22 approximating a vehicle trajectory path is illustrated in FIG. 3.

At least one of the primary objects of the present disclosure is to use the guidance curve 22 to generate guidance instructions. To do so involves at least three preliminary steps: (a) determining a nearest location point along the guidance curve 22 relative to the vehicle; (b) determining a tangent direction of the guidance curve 22 at the nearest location point; (c) determining curvature of the guidance curve 22 based, at least in part, on the tangent direction at the nearest location point.

The position of the vehicle 24 relative to the guidance curve 22 is required. A preferred method by which the position is ascertained is by determining $s=s_{nearest}$, corresponding the nearest location point 26 between the guidance curve 22 and the vehicle 24. In at least some aspects of the present disclosure, the "vehicle" may be a location of interest on the vehicle. The location of interest could be a center, a forward-most point, or any other suitable location on the vehicle.

Figure 5:
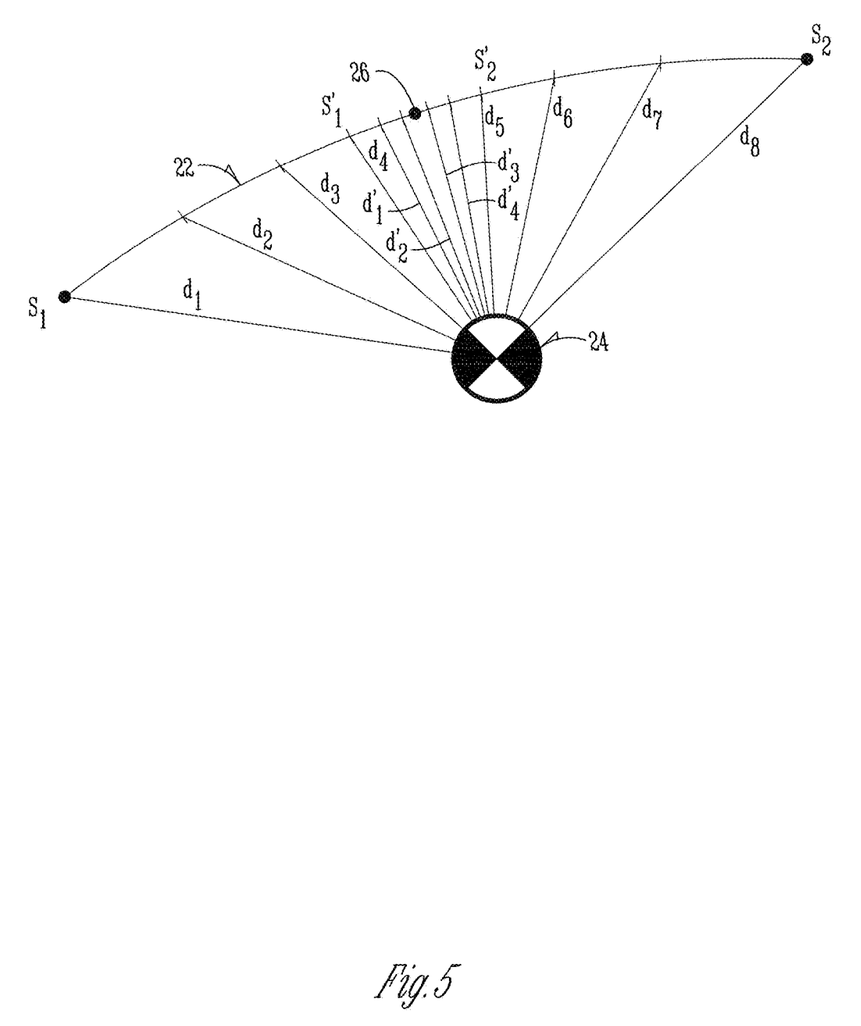
FIG. 5 illustrates a portion of a guidance curve with annotations showing an exemplary manner in which the nearest location point to the vehicle is determined.

To determine the nearest location point 26, equally-spaced values of s are chosen within the two endpoints (i.e., $s_0$ and $s_{length}$) of the guidance curve 22, as illustrated in FIG. 5. For each equally-spaced value, the distance from the location of the vehicle is computed. In the exemplary embodiment illustrated in FIG. 5, the distances are represented by $d_1$ through $d_8$. Of those values, the vehicle will necessarily be closest to two. Those two s values are retained as $s_1'$ and $s_2'$, and equally-spaced values of s are again evaluated between $s_1'$ and $s_2'$ to determine the smallest two of the distances ($d_1'$, $d_2'$, $d_3'$, $d_4'$) from the vehicle 24. The process is repeated recursively until a terminating condition for the recursion is satisfied. In a preferred embodiment, the terminating condition occurs when the s values are less than one centimeter apart, but the present disclosure contemplates any distance as a terminating condition. The nearest location point 26, $s_{nearest}$, is assigned the mean of the two final s values.

Figure 4:
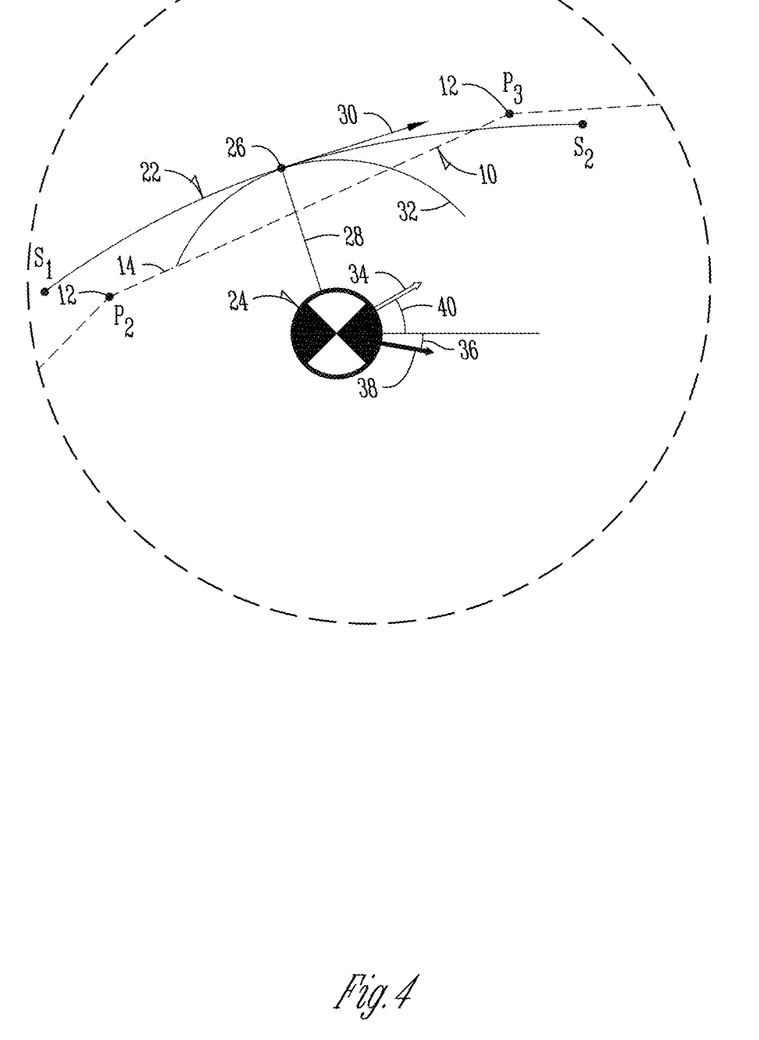
FIG. 4 illustrates a detailed view of the portion of FIG. 3 within circle 4-4.

Having determined $s_{nearest}$, the cross-track error 28, tangent direction 30 and instantaneous curvature 32 each at $s_{nearest}$ can be determined. Cross-track error 28 indicates how far the vehicle 24 is from the guidance curve 22, particularly at the nearest location point 26. In at least some aspects of the present disclosure, the cross-track error 28 can be utilized to add a heading offset to the tangent direction to provide a corrective heading direction 34 configured to move the vehicle 24 closer to the guidance curve 22, which will be disclosed in detail below.

A vehicle 24 following the guidance curve 22 must be travelling in the direction instantaneously tangent 30 to the curve at the nearest location point 26. To find the tangent direction 30 at $s_{nearest}$, $\bar{g}(s)$ is evaluated at $s+\epsilon$ and $s-\epsilon$, where $\epsilon$ may be any sufficiently small distance and which we choose to be r, the spacing distance between centers of RBFs 20. The tangent vector is approximated using a finite difference and can be defined as follows:

$$\begin{bmatrix} x(s+\epsilon) - x(s-\epsilon) \\ y(s+\epsilon) - x(s-\epsilon) \end{bmatrix}. \quad \text{(Eq. 10)}$$

The tangent direction 30 is expressed as a heading direction angle, $\psi_{curve}(s)$, as the inverse tangent of the components of the tangent direction vector from Eq. 10. If the vehicle is progressing along the guidance curve 22 opposite of the direction of increasing s, then the direction of the tangent vector is reversed by 180 degrees before it is incorporated in the heading feedback loop.

In order to follow the guidance curve 22, the curvature of the path of the vehicle 24 must match that of the guidance curve. Instantaneous curvature 32 at $s_{nearest}$ is used to compute a feed-forward steer angle 36 in the case of steered vehicles, or curvature command in the case of tracked vehicles. The feed-forward steer angle 36 required to achieve the curvature is calculated directly from the well-known kinematic relationship between steer angle and curvature.

The curvature 32 of the guidance curve 22 is computed using finite difference approximation at any value of s and can be defined as follows:

$$\kappa_{curve}(s) = \frac{\psi_{curve}(s+\epsilon) - \psi_{curve}(s-\epsilon)}{2\epsilon} \quad \text{(Eq. 11)}$$

In Eq. 11, $\psi_{curve}(s)$ is the instantaneous tangent direction 30 at s (in radians), and $\epsilon$ is a sufficiently small distance.

The guidance curve 22 and resulting guidance instructions are based on neither a spline nor an interpolation, but rather an approximation. The approximation does not pass precisely through each or every reference point, but rather follows an intermediate route between side-to-side deviations, attenuating the problematic effect of exaggerated instantaneous curvature inducing spurious steer angles. The guidance curve is approximate the vehicle trajectory path and configured to provide the intermediate route between deviations along the vehicle trajectory path with the minimal approximation error. The controller 38 adjusts the heading such that any effects of exaggerated instantaneous curvature along the vehicle trajectory path, among other things, is intermediated by the guidance curve with the minimal approximation error. The controller 38 generally does so through feedback control. The signals to the controller 38 must vary in a continuous manner as the vehicle progresses so as to avoid unpleasant discontinuities and errors.

The tangent direction 30 of the guidance curve 22 is required to perform feedback control of the vehicle heading 38. Among other things, the instantaneous tangent direction 30 provides a reference direction to provide to the controller 38. Further, the instantaneous curvature 32 is required to compute a feed-forward steer angle 36, which in turn determines the ultimate curvature of the vehicle path. The guidance instructions include the calculated feed-forward steer angle 36, which is provided to the controller to autonomously adjust the vehicle. A feedback steer 40 angle can be added to the feed-forward steer angle 36 to produce a heading offset which is added to the tangent direction 30 of the curve in order to produce a corrective heading direction 34, tending to bring the vehicle 24 back to the guidance curve 22. The controller 38 can provide visual feedback to the operator about the quality of the vehicle guidance.

In at least some embodiments of the present disclosure, the linear least-squares regression approximate can create some distortion at the ends of the path. While the RBFs 20 are centered on either side of reference points 12 in the middle of the vehicle trajectory path 10, an RBF 20 is only centered on one side of the reference points at the path ends, as illustrated in FIG. 2. In an exemplary embodiment, the path ends are augmented with waypoints in addition to the set of reference points. While waypoints and reference points are functionally the same, different terminology is used to show a distinction between the augmented portion of the vehicle trajectory path and the original portion of the vehicle trajectory path.

Before the guidance instructions are generated, one or both path ends by can be extended, extrapolated, or otherwise, with additional waypoints. In an exemplary embodiment, five waypoints are augmented to each end of the vehicle trajectory path. The augmented points are based, at least in part, on a segment of reference points proximate to the path ends. The augmented waypoints are added to the segment at the path end and spaced by a distance equal to distance separating the reference points of the segment, thereby preserving the equal spacing of the reference points (and waypoints) and the RBFs. In effect, the distorting effect is transferred beyond the path ends, minimizing distortion and preserves the tangent direction of the curve at the path ends.

Based on the nature of RBFs 20 as disclosed in the present disclosure, the basis functions are only locally influential. Thus, reference points remote to the position of the vehicle have little influence relative to the reference points proximate to the same, especially the nearest location point. Thus, for memory and computing requirements and efficiency, among other things, the guidance curve can be generated based on a subset of the two-dimensional reference points including the nearest location point of the vehicle. The subset of reference points could be considered a window. As the vehicle moves, the window is iteratively updated, effectively "sliding" along the guidance path with the vehicle. An updated guidance curve can be generated after each iterative update of the sliding window subset. In other words, each time an updated subset is chosen, the method of the present disclosure is executed to produce a new guidance curve, $\bar{g}(s)$, corresponding to the updated subset.

In at least some embodiments of the present disclosure, the reference points are evenly spaced along the vehicle trajectory path. During operation of the vehicle, however, irregular spacing of the reference points can occur. For example, if the speed of the vehicle changes during logging of the references point, the points recorded as the vehicle drives at a higher speed are spaced more sparsely than the points recorded when the vehicle drives more slowly. The irregular spacing can result in overfitting. More particularly, RBFs are locally influential, as mentioned, so in portions where the reference points are sparsely distributed, the RBFs outnumber the constraining reference points. Thus, more degrees of freedom exist in the system than reference points to constrain them. In such instances, the guidance curve, $\bar{g}(s)$, passes through the overfit points, but varies wildly from side to side of the intended path between those points.

In at least one embodiment of the present disclosure, employing the technique of regularization can provide equally-spaced reference points despite deviations in vehicle speed. Providing equally-spaced reference points, and thus basis functions, prevents overfitting of the guidance curve to densely or sparsely populated reference points. One exemplary technique is known as Tikhonov Regularization, also known as the Phillips-Twomey Method or ridge regression. To employ regularization, rather than solving the system $\phi w - x$ as above for the coefficient matrix W, a modified form of the system is solved, which can be defined as follows:

$$(\phi^T\phi+\lambda H)W=\phi^T X \quad \text{(Eq. 12)}$$

In Eq. 12, the matrices $\phi$, W, and X are the same as represented in Eq. X. H is a regularization matrix and $\lambda$ is a scalar. The effect of the modified form of the system changes the regression such that the minimized approximation error is not merely the residual between the reference points and the guidance curve. Rather, the regularized form of the regression includes a term that tends to exert some pressure to keep the size of the W-matrix entries smaller than they otherwise would be.

In an exemplary embodiment, the H matrix is the identity matrix, except the two diagonal entries corresponding to the non-RBF basis functions are made to be zero. In instances where the last two basis functions are $f(s)=1$ and $f(s)=s$, the matrix H can be defined as follows:

$$H = \begin{bmatrix} 1 & 0 & \ldots & \ldots & \ldots & 0 \\ 0 & 1 & \ddots & \ddots & \ddots & \vdots \\ \vdots & 0 & \ddots & 0 & \ddots & \vdots \\ \vdots & \ddots & \ddots & 1 & \ddots & \vdots \\ \vdots & \ddots & \ddots & 0 & 0 & \vdots \\ 0 & \ldots & \ldots & \ldots & \ldots & 0 \end{bmatrix} \quad \text{(Eq. 13)}$$

The scalar $\lambda$ serves as a parameter that determines the relative weighting placed on the regularization term in the error minimization. A relatively larger $\lambda$ tends to produce a solution with smaller $w_{xm}$, $w_{ym}$ coefficients at the expense of approximating the curve less accurately (at the reference points). By contrast, a relatively smaller $\lambda$ has the converse effect. The present disclosure recognizes the judicious compromise in determining the scalar: large enough to prevent overfitting, but small enough not to create undue inaccuracy in the path approximation.

In a preferred embodiment, $\lambda$ can be defined as follows:

$$\lambda = 10^{-9} \frac{\text{Trace}(\phi^T\phi)}{\text{Trace}(H)} \quad \text{(Eq. 14)}$$

The ratio of the matrix traces is as suggested by Press, et al., supra. Further, based on empirical data, the constant is $10^{-9}$ in a preferred embodiment, but any suitable value can be used without deviating from the objects of the present disclosure. The value suitably prevents overfitting while only causing a small increase in the position error of the guidance curve, $\bar{g}(s)$, at the reference points (i.e., typically on the order of millimeters).

Referring to Eq. 12 with known values for H and λ, and by choosing $A=\phi^T\phi+\lambda H$, and $B=\phi^T X$, the system can be defined as follows:

$$AW=B \quad \text{(Eq. 15)}$$

Eq. 15 is in a same form as the un-regularized system of Eq. 6, and can be solved with SVD implementation in the manner disclosed herein.

In such an embodiment, the cardinality of the basis functions is no longer constrained to be less than the number of reference points, since regularization permits finding solutions to under-constrained systems. In the preferred embodiment, however, the cardinality of basis functions is still chosen to be less than the cardinality of reference points.

Method

Figure 6:
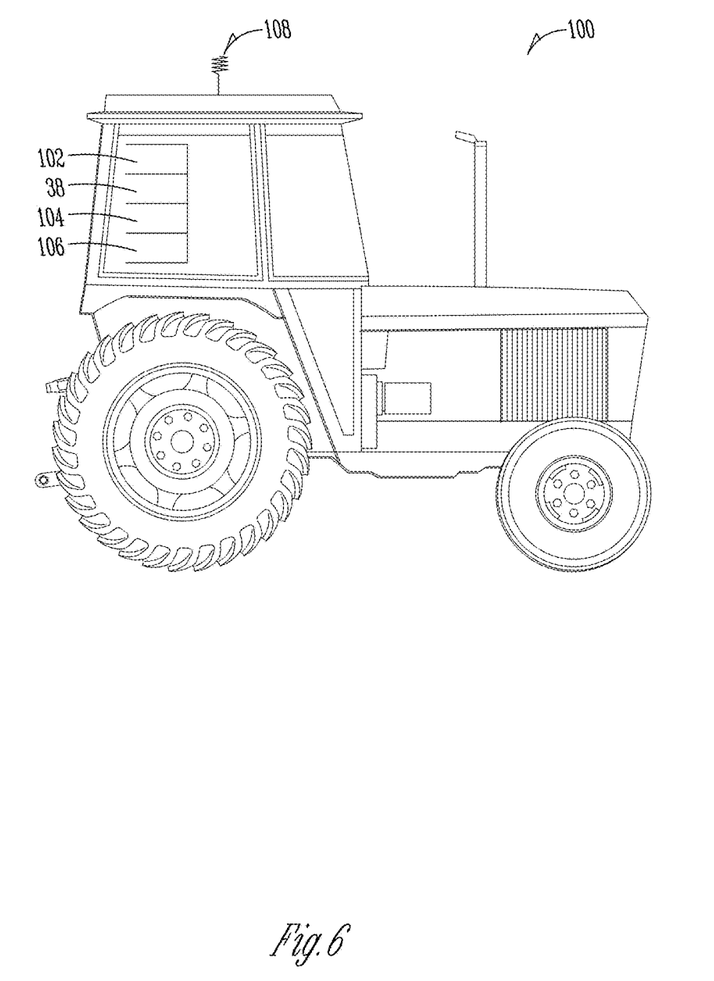
FIG. 6 illustrates a vehicle configured to implement exemplary embodiments of the present disclosure.

An exemplary vehicle 100 is illustrated in FIG. 7. The vehicle 100 includes positioning means 102, the controller 38, memory 104, locomotive means 106, and a receiver/transmitter 108. The positioning means 102 can include any means by which to receive collect, receive, or otherwise positioning information about the vehicle. Such means can include, but are not limited to Satellite Position System, Terrestrial Radio Positioning or Navigation System, Pseudolite-Based Positioning System, Code Differential Satellite Positioning System, Carrier Differential Satellite Position System, and Inertial Navigation System. The controller 38 is configured to receive and/or transmit information from the positioning means 102, memory 104, locomotive means 106, and/or receiver/transmitter 108. The controller 38 is configured to generate the guidance curve and/or the guidance instructions. In at least some embodiments, the generating of the guidance curve and/or guidance instructions is performed remotely, after which it is transmitted to the vehicle 100 via the receiver/transmitter 108. The memory 104 is configured to, among other things, store positioning data and reference points collected by the vehicle 100. The locomotive means 106 is configured to, among other things, execute the guidance instructions through steering and powering the vehicle 100.

The term "vehicle" can mean any mobile machine that transports people or cargo. In preferred embodiments, the vehicle is an agricultural implement or passenger automobile, but the present disclosure contemplates vehicles such as bicycles, watercraft, railed vehicles, aircraft, spacecraft, and the like. The vehicles can be wheeled, tracked, railed or skied without deviating from the objects of the present disclosure.

The disclosure is not to be limited to the particular embodiments described herein. The present disclosure contemplates numerous related methods and systems to approximate a vehicle trajectory path in an improved manner and provide improved guidance instructions to a controller to guide the vehicle. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the disclosure. It is understood that other modifications, substitutions, and/or additions can be made, which are within the intended spirit and scope of the disclosure. From the foregoing, it can be seen that the disclosure accomplishes at least all that is intended.

The previous detailed description is of a small number of embodiments for implementing the disclosure and is not intended to be limiting in scope. The following claims set forth a number of the embodiments of the disclosure with greater particularity.

What is claimed is:

1. A method of autonomous vehicle guidance comprising the steps of:
   providing a vehicle having a controller configured to guide the vehicle;
   receiving a set of two-dimensional reference points comprising a vehicle trajectory path;
   generating a guidance curve for the vehicle trajectory path by summing a weighted plurality of basis functions for each component of a coordinate pair, wherein the weighted plurality of basis functions has a cardinality less than a cardinality of the two-dimensional reference points, and uses linear least-squares regression with minimal approximation error between the basis functions of the guidance curve and the reference points of the vehicle trajectory path;
   generating guidance instructions comprising:
      (a) determining a nearest location point along the guidance curve relative to the vehicle;
      (b) determining a tangent direction of the guidance curve at the nearest location point;
      (c) determining curvature of the guidance curve based, at least in part, on the tangent direction at the nearest location point; and
   autonomously guiding the vehicle along the guidance curve with the guidance instructions provided to the controller of the vehicle, wherein the guidance curve is approximate the vehicle trajectory path and configured to provide an intermediate route between deviations along the vehicle trajectory path with the minimal approximation error.

2. The method of claim 1 wherein the weighted plurality of basis functions is a weighted plurality of radial basis functions.

3. The method of claim 1 wherein each of the weighted plurality of basis functions comprises a product of a coefficient and one of the weighted plurality of basis functions, wherein the coefficient is determined through the linear least-squares regression.

4. The method of claim 1 wherein the weighted plurality of basis functions is evenly spaced along the vehicle trajectory path.

5. The method of claim 1 wherein the step of generating guidance instructions further comprises calculating a feed-forward steer angle based, at least in part, on the curvature of a guidance curve at the nearest location point, wherein the guidance instructions provided to the controller autonomously adjusts the vehicle to the feed-forward steer angle.

6. The method of claim 4 wherein the step of determining the nearest location point further comprises iteratively evaluating the evenly-spaced plurality of basis functions until a terminating condition is achieved.

7. The method of claim 5 further comprising the step of adding a feedback steer angle to the feed-forward steer angle.

8. The method of claim 1 wherein the linear least-squares regression comprises using singular value decomposition implementation.

9. The method of claim 1 further comprising the step of augmenting path ends of the vehicle trajectory path with two-dimensional waypoints in addition to the set of two-dimensional reference points to minimize distortion associated with the path ends of the vehicle trajectory path proximate to the nearest location point.

10. The method of claim 9 wherein minimizing distortion preserves the tangent direction of the guidance curve at the path ends.

11. The method of claim 1 further comprising the steps of:
iteratively updating a sliding window subset comprising a subset of the two-dimensional reference points including the nearest location point of the vehicle; and
generating an updated guidance curve after each iterative update of the sliding window subset.

12. The method of claim 1 further comprising the steps of:
determining cross-track error equal to a distance from the guidance curve at the nearest location point; and
adding a heading offset to the tangent direction to provide a corrective heading direction configured to move the vehicle closer to the guidance curve.

13. A system for autonomous vehicle guidance comprising:
a vehicle having a controller configured to guide the vehicle;
a guidance curve approximating a vehicle trajectory path comprising a set of two-dimensional reference points provided to the controller of the vehicle, the guidance curve based, at least in part, on a summed plurality of radial basis functions each multiplied by a coefficient prior to summation;
guidance instructions based, at least in part, on a nearest location point along the guidance curve to the vehicle, a tangent direction of the guidance curve at the nearest location point, and a curvature of the guidance curve based on the tangent direction at the nearest location point;
wherein the controller adjusts heading of the vehicle to autonomously guide the vehicle along the guidance curve approximate the vehicle trajectory path such that deviations along the vehicle trajectory path are intermediated by the guidance curve.

14. The system of claim 13 further comprising a feed-forward steer angle based, at least in part, on the curvature of the guidance curve at the nearest location point, wherein the controller adjusts the feed-forward steer angle.

15. The system of claim 13 wherein the coefficient for each radial basis function is determined using linear least-squares regression configured to minimize approximation error between the guidance curve and the vehicle trajectory path.

16. The system of claim 15 wherein the plurality of radial basis functions has a cardinality less than a cardinality of the two-dimensional reference points.

17. The system of claim 13 wherein each of the plurality of radial basis functions is associated with one component of a coordinate pair each associated with easterly and northerly directions.

18. The system of claim 13 further comprising regularization of the set of two-dimensional reference points to compensate for irregular spacing due to variations in speed during the autonomous guidance of the vehicle.

19. The system of claim 18 wherein the regularization is achieved by ridge regression based, at least in part, on a ratio of matrix traces.

20. The system of claim 13 wherein the vehicle does not pass through every one of the two-dimensional reference points.

21. The system of claim 13 wherein the controller executes a closed heading control feedback loop.

22. The system of claim 13 wherein the vehicle is an agricultural implement.

* * * * *